US007081489B2

(12) United States Patent
Chen et al.

(10) Patent No.: US 7,081,489 B2
(45) Date of Patent: Jul. 25, 2006

(54) POLYMERIC ENCAPSULATION OF NANOPARTICLES

(75) Inventors: Ching-Jen Chen, Tallahassee, FL (US); Yousef Haik, Tallahassee, FL (US); Jhunu Chatterjee, Tallahassee, FL (US)

(73) Assignee: Florida State University Research Foundation, Tallahassee, FL (US)

( * ) Notice: Subject to any disclaimer, the term of this patent is extended or adjusted under 35 U.S.C. 154(b) by 535 days.

(21) Appl. No.: 10/215,306

(22) Filed: Aug. 8, 2002

(65) Prior Publication Data

US 2003/0146529 A1   Aug. 7, 2003

Related U.S. Application Data

(60) Provisional application No. 60/311,277, filed on Aug. 9, 2001.

(51) Int. Cl.
 *C08K 9/10* (2006.01)
(52) U.S. Cl. ........................ 523/200; 523/210
(58) Field of Classification Search ................ 523/210, 523/205, 200; 524/430
 See application file for complete search history.

(56) References Cited

U.S. PATENT DOCUMENTS

| | | | |
|---|---|---|---|
| 4,654,267 A | | 3/1987 | Ugelstad et al. |
| 4,774,265 A | | 9/1988 | Ugelstad et al. |
| 4,861,627 A | | 8/1989 | Mathiowitz et al. |
| 5,720,921 A | | 2/1998 | Meserol |
| 5,763,203 A | | 6/1998 | Ugelstad et al. |
| 5,874,029 A | | 2/1999 | Subramaniam et al. |
| 5,985,312 A | | 11/1999 | Jacob et al. |
| 6,048,515 A | * | 4/2000 | Kresse et al. ............ 424/9.322 |
| 6,129,848 A | | 10/2000 | Chen et al. |
| 6,143,211 A | * | 11/2000 | Mathiowitz et al. ........... 264/4 |
| 6,632,671 B1 | * | 10/2003 | Unger ........................ 435/455 |
| 2003/0086867 A1 | | 5/2003 | Lanza et al. |

OTHER PUBLICATIONS

Chatterjee, et al., "Modification and characterization of polystyrene-based magnetic microspheres and comparison with albumin-based magnetic microspheres," *J. Magnetism & Magnetic Mater.* 225: 21-29 (2001).

Chatterjee, et al., "Synthesis and characterization of heat-stabilized albumin magnetic microspheres," *Colloid & Polymer Sci.*, 279:1073-81 (2001).
Kyung-Nam Lee, et al., "Synthesis of phenolic/fufural gel microspheres in supercritical CO2," *J. Supercrit. Fluids* 17:73-80 (2000).
Suslick, et al., "Nanostructured Materials Generated by High-Intensity Ultrasound: Sonochemical Synthesis and Catalytic Studies," *Chem. Mater.* 8:2172-79 (1996).
Yarovoy, et al., "Submicron-Sized Particles of Ultrahigh Molecular Weight Polyethylene Product via Nonsolvent and Temperature-Induced Crystallization," *J. Biomed. Mater. Res.* (*Appl Biomater.*) 53:152-60 (2000).
Gupta, et al., "Albumin Microspheres. III. Synthesis and Characterization of Microspheres Containing Adriamycin and Magnetite", *International Journal of Pharmaceutics*, 43:167-177 (1988).
Morimoto, et al., "Albumin Microspheres as Drug Carriers", *CRC Critical Reviews in Therapeutic Drug Carrier Systems*, vol. 2, pp. 19-63.

* cited by examiner

*Primary Examiner*—Katarzyna Wyrozebski
(74) *Attorney, Agent, or Firm*—Sutherland Asbill & Brennan LLP

(57) ABSTRACT

Polymeric nanoencapsulation methods, which combine sonication and nonsolvent temperature induced crystallization, are provided. The steps include (a) providing active agent nanoparticles having an average diameter between about 5 and about 100 nm; (b) treating said active agent nanoparticles (e.g., a superparamagnetic material) with an anionic surfactant to form modified active agent nanoparticles; (c) mixing the modified active agent nanoparticles with a solution of a polymer in a solvent at a first temperature, which is greater than the melting temperature of the polymer and less than the boiling point of the solvent to form a first mixture, said mixing comprising the use of sonication; (d) mixing a non-solvent with the first mixture to form a second mixture, the non-solvent being a non-solvent for the solvent and for the polymer and having a boiling point greater than the melting temperature of the polymer; (e) sonicating the second mixture to form an emulsion; and (f) cooling the emulsion to a second temperature and at a rate effective to precipitate polymeric nanoparticles comprising the polymer with the modified active agent nanoparticles dispersed therein.

34 Claims, 9 Drawing Sheets

100 nm 500 nm 100 nm 500 nm 100 nm 100 nm 100 nm 100 nm

POLYMERIC ENCAPSULATION OF NANOPARTICLES

CROSS-REFERENCE TO RELATED APPLICATIONS

Priority is claimed under 35 U.S.C. § 119 to U.S. provisional application Ser. No. 60/311,277, filed Aug. 9, 2001.

BACKGROUND OF THE INVENTION

This invention relates generally to nanoencapsulation methods, particularly for synthesizing polymeric magnetic nanoparticles, for use in biomedical or other applications.

Various polymer-based nanoparticles have been synthesized for biomedical applications, primarily in the areas of drug delivery, immunoassay, and cell separation technologies. Non-magnetic particles made of water-insoluble polymers, such as polyethylene, polypropylene, and polystyrene particles, have been used as cleansing agent components in the cosmetics industry (U.S. Pat. No. 5,720,921 to Fowler, et al.) and to study how bodily fluids affect polymer particles in vitro (Yaravoy, et al., *J. Biomed. Mat. Res.* 53:152 (2000)). Such study is required to better understand the behavior of these polymers when they form submicron-sized particulate debris caused by wear and tear of polymeric compositions and structures implanted in the human body. Magnetic particles made with these polymers have been used in magnetic cell separation and in immunoassays. Polymer composite particles and encapsulated particles can be prepared, for example, by emulsion polymerization (e.g., Sauzedde, et al., *Coll. Polym. Sci.* 277:846 (1999)), by solvent evaporation (Mathiowitz, *Scanning Microsc.* 4:329 (1990)), or by hot melt methods (Mathiowitz, et al., *J. Contrl. Release* 5:13 (1987)).

Chatterjee, et al., *J. Mag. Magn. Mat.* 225:21 (2001) discloses a method of forming encapsulated particles by dissolving a polymer and a particular inorganic particle in an aqueous solvent, forming an oil-in-water emulsion, and stabilizing the particles using chemical cross-linking. The stabilization by chemical cross-linking can undesirably permit agglomeration. It therefore would be desirable to avoid using a chemical cross-linker in a process for forming nanoparticles.

U.S. Pat. No. 5,874,029 to Subramaniam, et al. discloses a method of microparticle formation by recrystallization of organic solutions sprayed into a compressed antisolvent. In this process, a compressed gas and the solvent are passed through a spray nozzle to form atomized droplets. These droplets are sprayed into a critical anti-solvent that causes depletion of the anti-solvent and formation of particles. The high pressures required to use supercritical fluids in such a process requires special, sophisticated processing equipment and instrumentation. It would be desirable to provide process for making such particles without the need for such special equipment.

U.S. Pat. No. 6,143,211 to Mathiowitz, et al., discloses the "phase inversion" of polymer solutions for the spontaneous formation of nanospheres by using relatively low viscosities and/or relatively low polymer concentrations, solvent and nonsolvent pairs that are miscible. U.S. Pat. No. 5,985,312 to Jacob, et al., discloses the incorporation of metal oxides into polymeric microspheres to improve the bioadhesive properties of the polymer. These and other publications disclose a variety of techniques, including solvent evaporation, hot melt microencapsulation, spray drying, phase inversion, low temperature casting, and synthesis of double wall microspheres and hydrogel microparticles, each of which require the formation of an emulsion or droplet before precipitation of the product microparticle. These methods may not be reliable or effective for making nanoparticles, particularly in the smaller sizes and particularly from crystalline polymers that are insoluble at room temperature in most useful solvents. These processes also may fail to produce the particles in desirable yields.

It would be desirable to provide improved, relatively simple methods for forming polymeric nanoparticles. It would be particularly desirable to make such nanoparticles without requiring an emulsion polymerization reaction.

SUMMARY OF THE INVENTION

Polymeric nanoencapsulation methods are provided, along with compositions comprising nanoparticles and an encapsulated active agent.

In one aspect, the method of making polymeric nanoparticles comprises: (a) providing active agent nanoparticles having an average diameter between about 5 and about 100 nm; (b) treating said active agent nanoparticles with an anionic surfactant to form modified active agent nanoparticles; (c) mixing the modified active agent nanoparticles with a solution of a polymer in a solvent at a first temperature, which is greater than the melting temperature of the polymer and less than the boiling point of the solvent to form a first mixture, said mixing comprising the use of sonication; (d) mixing a non-solvent with the first mixture to form a second mixture, the non-solvent being a non-solvent for the solvent and for the polymer and having a boiling point greater than the melting temperature of the polymer; (e) sonicating the second mixture to form an emulsion; and (f) cooling the emulsion to a second temperature and at a rate effective to precipitate polymeric nanoparticles comprising the polymer with the modified active agent nanoparticles dispersed therein. In one embodiment, the mixing of a non-solvent with the first mixture and the sonicating of the second mixture are conducted in the same step. The method can further comprise isolating the polymeric nanoparticles from the solvent and the non-solvent.

The polymer preferably is a crystalline polymer, and preferably has a melting temperature of less than about 200° C. The concentration of polymer in the solution preferably is between 0.01 and 0.1 w/v %. The polymer can be selected, for example, from polyamides, polcarbonates, polyalkenes, polyvinyl ethers, polyglycolides, cellulose ethers, polyvinyl halides, polyglycolic acid, and polylactic acid. In one embodiment, the polymer comprises polyethylene.

In one embodiment, the step of treating the active agent nanoparticles with an anionic surfactant comprises mixing the active agent nanoparticles in an aqueous solution of the anionic surfactant and then drying the mixture to remove water and form a dry powder comprising the modified active agent nanoparticles. Representative examples of anionic surfactants include sodium oleate, sodium palmitate, sodium myristate, sodium stearate, and sodium dodecyl sulphate.

The solvent for the polymer typically is selected to have a melting temperature at least 10° C. higher than the melting temperature of the polymer. Representative examples of suitable solvents include decalin, octamethylcyclotetrasiloxane, tetralin, toluene, and dodecane. In one embodiment, the non-solvent is immiscible with the solvent at room temperature. A non-limiting example of a suitable non-solvent is tetraglyme. One skilled in the art can select the appropriate combination of polymer, solvent, and non-solvent for use in the present method.

In one embodiment, the polymeric nanoparticles have an average diameter between 50 and 500 nm, for example, between 200 and 400 nm.

In another aspect, the method can further comprise the step of adsorbing a protein-binding ligand (e.g., avidin, biotin, and streptavidin) onto the polymeric nanoparticles. In still another aspect, the method can further comprise the step of encapsulating the polymeric nanoparticles in a polymeric shell. Examples of suitable polymeric shell materials include polyesters, polyanhydrides, polystyrenes, and blends thereof. In one embodiment, the polymeric shell comprises polymers of lactic acid or glycolic acid or a poly(lactide-co-glycolide).

In one aspect, the active agent nanoparticles can comprise magnetic materials, drugs, diagnostic agents, inorganic fertilizers, or inorganic pigments. In one embodiment, the active agent nanoparticles have a number average diameter between about 5 nm and about 10 nm. In a preferred embodiment, the active agent nanoparticles include superparamagnetic nanoparticles, such nanoparticles comprised of iron, nickel, cobalt, or combinations thereof. In one embodiment, the superparamagnetic nanoparticles comprise maghemite.

In a further aspect, the method of making polymeric nanoparticles comprises (a) providing superparamagnetic nanoparticles having an average diameter between about 5 and about 10 nm; (b) treating said superparamagnetic nanoparticles with an anionic surfactant to form modified superparamagnetic nanoparticles; (c) mixing the modified superparamagnetic nanoparticles with a solution of a polymer in a solvent at a first temperature, which is greater than the melting temperature of the polymer and less than the boiling point of the solvent to form a first mixture, said mixing comprising the use of sonication; (d) mixing a non-solvent with the first mixture to form a second mixture, the non-solvent being a non-solvent for the solvent and for the polymer and having a boiling point greater than the melting temperature of the polymer; (e) sonicating the second mixture to form an emulsion; and (f) cooling the emulsion to a second temperature and at a rate effective to precipitate polymeric nanoparticles comprising the polymer with the modified superparamagnetic nanoparticles dispersed therein. In one embodiment, the superparamagnetic nanoparticles comprise maghemite. In another embodiment, the polymer comprises polyethylene. In a further embodiment, the superparamagnetic nanoparticles comprise maghemite and the polymer comprises maghemite.

DETAILED DESCRIPTION OF THE INVENTION

Figure 1:
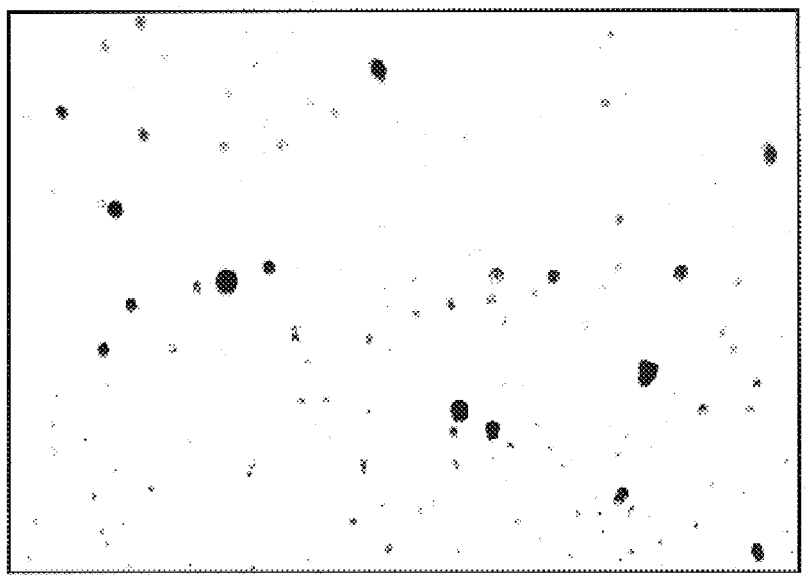
FIG. 1 is an optical micrograph (×1000) of polyethylene/maghemite composite nanoparticles obtained by one embodiment of the process.
Figure 2:
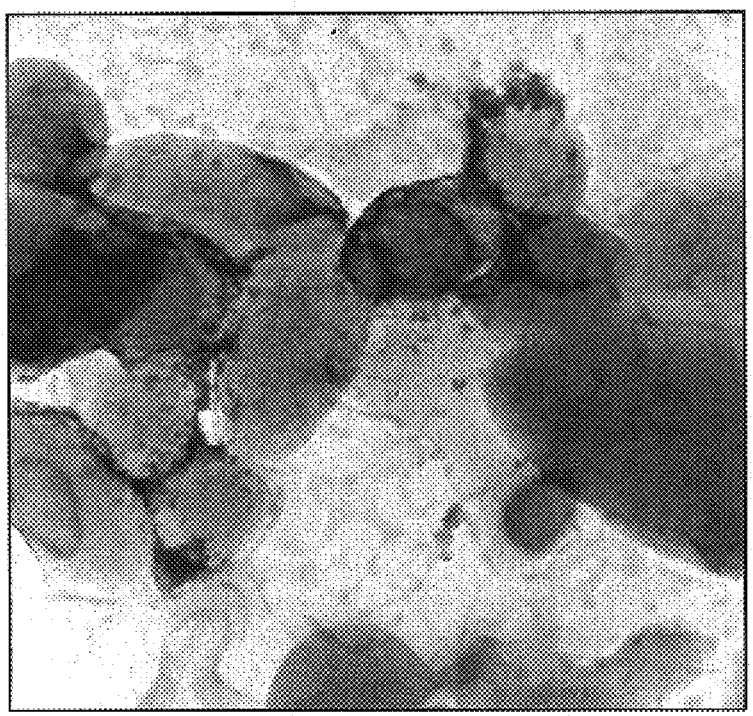
FIG. 2 is a transmission electron micrograph of polyethylene/maghemite composite nanoparticles obtained by one embodiment of the process.
Figure 3:
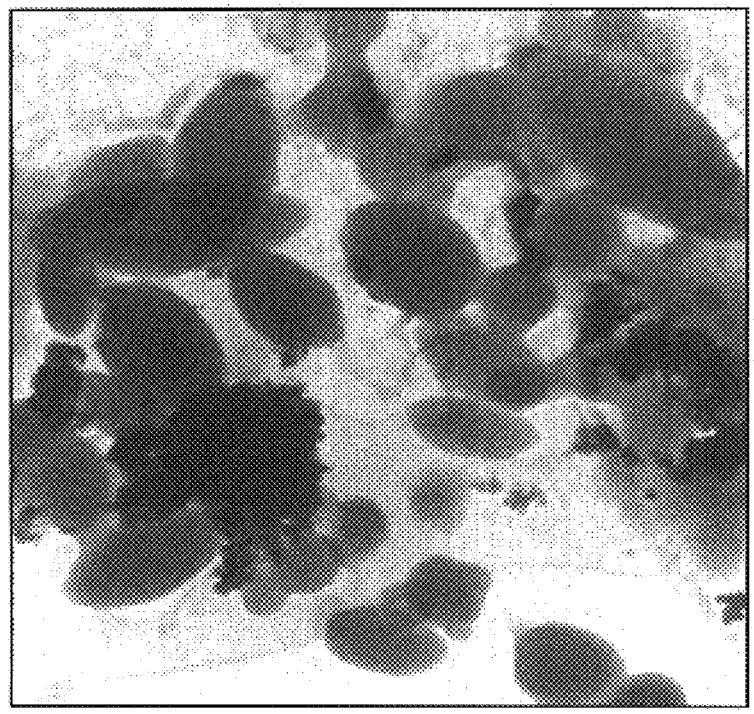
FIG. 3 is a transmission electron micrograph of polyethylene/maghemite composite nanoparticles obtained by one embodiment of the process.
Figure 4:
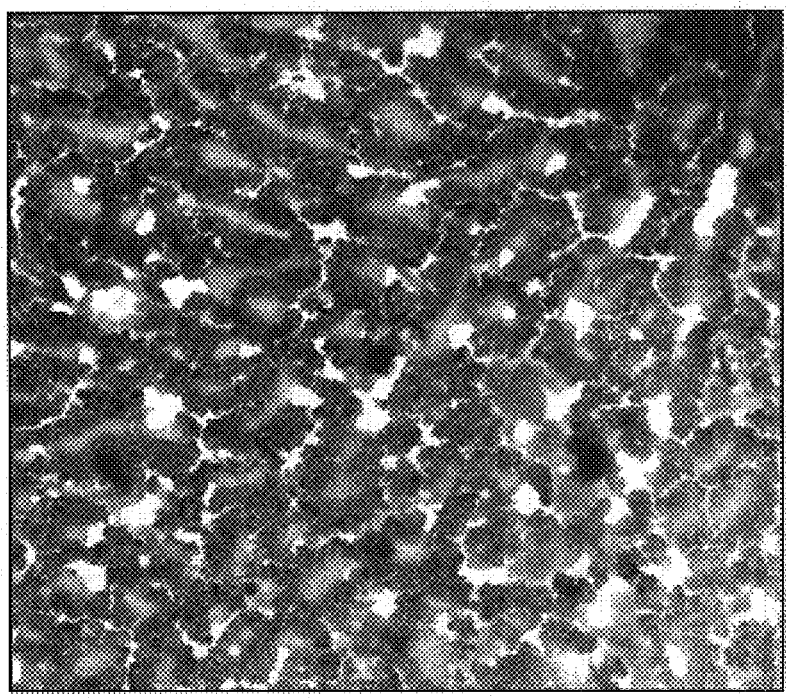
FIG. 4 is a transmission electron micrograph of polyethylene/maghemite composite nanoparticles obtained by one embodiment of the process.

Improved nanoencapsulation methods have been developed for making polymeric nanoparticles without the need for emulsion polymerization.

Methods of Making the Polymeric Nanoparticles

The method employs a combination of sonication and nonsolvent temperature induced crystallization to synthesize magnetic nanoparticles, or other active agents, encapsulated by polymers. With this process, nanoparticles of crystalline polymers that are insoluble at room temperature can be obtained in high yields.

1. General Method Steps

In one aspect, the nanoencapsulation method includes the following steps: (a) providing active agent nanoparticles having an average diameter between about 5 and about 100 nm; (b) treating said active agent nanoparticles with an anionic surfactant to form modified active agent nanoparticles; (c) mixing the modified active agent nanoparticles with a solution of a polymer in a solvent at a first temperature, which is greater than the melting temperature of the polymer and less than the boiling point of the solvent to form a first mixture, said mixing comprising the use of sonication; (d) mixing a non-solvent with the first mixture to form a second mixture, the non-solvent being a non-solvent for the solvent and for the polymer and having a boiling point greater than the melting temperature of the polymer; (e) sonicating the second mixture to form an emulsion; and (f) cooling the emulsion to a second temperature and at a rate effective to precipitate polymeric nanoparticles comprising the polymer with the modified active agent nanoparticles dispersed therein. The mixing of a non-solvent with the first mixture and the sonicating of the second mixture can be conducted in the same step. The method can further comprise isolating the polymeric nanoparticles from the solvent and the non-solvent.

In one particular embodiment, the method steps include (a) providing superparamagnetic nanoparticles, preferably having an average diameter between about 5 and about 10 nm; (b) treating said superparamagnetic nanoparticles with an anionic surfactant to form modified superparamagnetic nanoparticles; (c) mixing the modified superparamagnetic nanoparticles with a solution of a polymer in a solvent at a first temperature greater than the melting temperature of the polymer and less than the boiling point of the solvent to form a first mixture, said mixing comprising the use of sonication; (d) mixing a non-solvent with the first mixture to form a second mixture, the non-solvent being a non-solvent for the solvent and for the polymer and having a boiling point greater than the melting temperature of the polymer; (e) sonicating the second mixture to form an emulsion; and (f) cooling the emulsion to a second temperature and at a rate effective to precipitate polymeric nanoparticles comprising the polymer with the modified superparamagnetic nanoparticles dispersed therein. The method can further comprise (g) isolating the polymeric nanospheres from the solvent and the non-solvent.

2. Obtaining and Modifying the Active Agent Nanoparticles

The active agent nanoparticles can be obtained using methods known in the art, depending, for example, on the particular active agent to be nanoencapsulated, and the desired size of the particles. Methods for making the superparamagnetic nanoparticles can be produced using any suitable process known in the art or described herein. For example, one technique for producing iron oxide nanoparticles involves co-precipitation and sonication and is described in Example 1 below, wherein particles having an average size between about 5 and about 10 nm were made. As another example, a process for making nanoparticles comprising iron, neodymium, and boron is described in Example 7 below.

Once obtained, the superparamagnetic nanoparticles or other active agent nanoparticles can be modified by treating them with an anionic surfactant to render them susceptible to nanoencapsulation, that is, to promote their complexation or attachment to the polymer in the presently described encapsulation method. In one embodiment, the nanoparticles in a powder form are added to an aqueous solution of an anionic surfactant, subjected to mixing conditions for a period of time, and then dried to remove the water so as to yield a dry powder comprising (surface) modified active agent nanoparticles.

3. Forming the Composite Nanoparticles

The modified superparamagnetic nanoparticles or active agent nanoparticles are then mixed into a solution of a polymer in a solvent, with the use of sonication, which subsequently is mixed with a non-solvent, again using sonication as the mixing means. The sonication of the first mixture (polymer/solvent/active agent particles) with the non-solvent cause the formation of microdroplets of the polymer with active agent particles, and during cooling these microdroplets crystallize in the non-solvent, causing a phase separation.

The mixing of the non-solvent with the first mixture and the sonicating of the second mixture can be conducted in the same step or separate steps.

The polymer solution should be highly dilute, preferably between about 0.01 and 0.1 w/v % (e.g., about 0.5 w/v %). Such high dilution is desirable because the procedure involves crystallization, and high dilution is generally warranted to produce nanoparticles of the desired small size.

Ultrasonic mixing enables the formation of homogeneous emulsion with very well dispersed phases of polymer and superparamagnetic material. Preferably, the sonication is conducted at an amplitude between about 50% and about 60%. While higher amplitudes usually give smaller particles, such a process would generate significant amounts of unneeded heat. Generally, sonication for about 30 seconds is sufficient to achieve a homogenous mixture. As used herein, "sonication", "ultrasonic mixing," and "ultrasonication" all refer to the technique known in the art that uses the application of acoustic energy to mix components together.

These mixing steps are conducted at an elevated, or high, temperature, which is a temperature greater than the melting temperature of the polymer. The high temperature ultrasonication of solvent, nonsolvent, polymer solution, and modified nanoparticles causes the polymer to break into microdroplets of polymer solution, which form a microphase-separated system separating two liquid phases.

The subsequent cooling step cools the emulsion to a second temperature and at a rate effective to precipitate polymeric nanoparticles comprising the polymer with the modified superparamagnetic (or other active agent) nanoparticles dispersed therein. The cooling causes the polymer to precipitate and crystallize, in a non-solvent phase in which the superparamagnetic (or other active agent) nanoparticles are dispersed.

The polymeric nanoparticles comprising crystallized polymer encapsulating superparamagnetic (or other active agent) nanoparticles, i.e. the composite nanoparticles, can then be isolated from the solvent and non-solvent using any conventional separation technique, such as filtration, centrifugation, or combinations thereof. They may also be subjected to a sizing or screening process to produce a collection of nanoparticles having a more uniform or narrow size distribution, as needed.

4. Coating the Composite Nanoparticles

The composite nanoparticles can be further coated with another material to give the nanoparticles one or another functional properties. For example, the composite nanoparticles can be treated with a protein binding ligand (e.g., as described in Example 2 below) or further encapsulated within a polymeric shell, such as a biocompatible coating material (e.g., as described in Example, 6 below). Other coating techniques known in the art could also be used or readily adapted. See, e.g., U.S. Pat. No. 5,985,354 to Mathiowitz, et al., which describes a process for making multi-layered polymer particles.

Process Materials

1. Active Agent Nanoparticles

The active agent (i.e. the agent of interest, the material to be encapsulated) can be essentially any nanoparticulate material that is stable across the range of temperatures encountered by the material in the present nanoencapsulation process, and that is substantially non-reactive with the particular solvent and nonsolvent used. Examples of active agents include, but are not limited to magnetic materials, drugs (i.e. therapeutic or prophylactic agents), diagnostic agents (e.g., contrast agents), inorganic fertilizers, or inorganic pigments.

In a preferred embodiment, the active agent nanoparticles comprise or consist of superparamagnetic nanoparticles. The superparamagnetic nanoparticles preferably have an average diameter between about 5 nm and about 10 nm. The superparamagnetic nanoparticles can comprise iron, nickel, cobalt, and/or their alloys. A preferred material for the superparamagnetic nanoparticles is an iron oxide, such as magnetite, or more preferably, maghemite ($\lambda Fe_{2,3}$). (Magnetite is susceptible to oxidation, whereas maghemite is more stable to oxidation.) In other embodiments, the magnetic nanoparticles comprise an alloy or a mixture of elemental materials. For example, the magnetic nanoparticles can comprise iron-neodymium-boron, which can be made as described in Example 7.

The size of the active agent particle preferably is between about 5 nm and about 100 nm. Particularly for magnetic particles, the smaller sizes, e.g., between about 5 nm and about 10 nm, is preferred. A small size distribution is also preferred, as this can aid in determining the necessary magnetic force to separate the nanoparticles from a fluid medium.

2. Anionic Surfactants

Suitable anionic surfactants include fatty acid salts, such as sodium oleate. Representative examples of other suitable anionic surfactants include sodium palmitate, sodium myristate, sodium stearate, and sodium dodecyl sulphate.

3. Polymers

The polymer is a water insoluble, thermoplastic polymer. It preferably is a crystalline polymer, as the present nanoencapsulation process involves a temperature induced crystallization process that is difficult to perform in polymers having more amorphous regions than crystalline regions. As used herein the term "crystalline polymers" refers to polymers that are at least 60% crystalline. For certain biomedical applications, the preferred polymer is biocompatible.

The polymer should be soluble in an organic solvent having a relative high boiling point. Preferably, the polymer has a relatively low melting point, such as less than about 200° C., more preferably less than 180° C., and most preferably about 150° C. or less. Polymers having greater melting temperatures, however, could also be used. One skilled in the art can select a suitable solvent/non-solvent system for a particular polymer based, at least in part, on the polymer's melting point and solubility at ambient and elevated temperatures.

The molecular weight of the polymer is one variable that can affect the size of the resulting nanoparticle. The molecular weight of the polymer used in the process can be between about 1 kDa and about 500 kDa, although the preferred molecular weight is between about 1 kDa and 50 kDa for most polymers used in the process. Molecular weights less than 1 kDa may also be used. For example, polyethylene having a number average molecular weight of about 700 g/mole has been found useful in the nanoencapsulation process, as has polypropylene having a number average molecular weight of about 1,000 g/mole.

Examples of polymer suitable for use in the process include, but are not limited to, polyamides, polcarbonates, polyalkenes, polyvinyl ethers, polyglycolides, cellulose ethers (e.g., hydroxy propyl cellulose, hydroxy propyl methyl cellulose, and hydroxy butyl cellulose), polyvinyl halides, polyglycolic acid, and polylactic acid. In one embodiment, the polymer is polyethylene.

5. Solvents and Nonsolvents

High boiling solvents and nonsolvents are preferred in order to increase the undercooling which enhanced the crystallization process. Undercooling is the difference of between the equilibrium melting temperature and the crystallization temperature for a polymer. The rate of crystallization is strongly dependent on the crystallization temperature. When crystallized just below the melting temperature, rate of crystallization is low. For most of the polymers, high undercooling is required for crystallization, and the reason for this behavior is related to the high interfacial free energy associated with the basal plane of the crystallite and the difficulty in extracting ordered sequences of sufficient length from the disordered melt. So high undercooling allows sufficient time to extract the ordered sequence to form a crystal.

The solvent and non-solvent should be non-reactive with the polymer or with the active agent material, across the temperature range of the encapsulation process. Low toxicity and high stability are also generally preferred characteristics for the solvent and nonsolvent.

Other criteria for selecting the solvent include the boiling temperature of the solvent. It typically should be at least 10° C. higher than the melting temperature of the polymer. The solvent also preferably is immiscible with the nonsolvent at room temperature (e.g., about 20 to 27° C.). The viscosity of the dilute solution in the solvent preferably is between about 2 and 6 centipoise. Suitable solvents should also be able to form a polymer solution at the elevated temperature. Suitable solvents include non-polar solvents, including, but not limited to, decalin, tetralin, toluene, and dodecane. Solvents useful with polyethylene include decalin and octamethylcyclotetrasiloxane (OMCTS).

Other criteria for selecting the non-solvent include a high boiling temperature (that is, at least higher than the melting point of the selected polymer) and temperature dependent miscibility with the solvent selected. An example of a suitable nonsolvent includes, but is not limited to, tetraethylene glycol dimethyl ether ("tetraglyme"). More polar organic compounds can act as a nonsolvent for polyethylenes at higher temperatures.

6. Protein-Binding Ligands

Optionally, a variety of protein-binding ligands can be adsorbed onto the composite nanoparticles. Representative examples of suitable ligands include avidin, biotin, streptavidin, and lectins.

For example, in one embodiment, avidin-coating polymeric magnetic nanoparticles can be used in the magnetic separation of red blood cells. The avidin can act as a bridge that couples with polymeric nanoparticles modified with biotinylated lectin. The lectin in the magnetic particle attaches to the sugar terminal on the red blood cell membrane, enabling the red blood cell to be separated from its biological medium.

7. Additional Polymeric Coating

Optionally, the polymeric nanoparticles can be further encapsulated in a polymeric shell to provide additional or a different functionality. For example, it may be desirable to ensure that the magnetic material is within the particle and not on the surface of the particle. In addition, the polymeric coating may serve to functionalize the particle, for example to couple it with a suitable ligand. For example, a polystyrene magnetic particle can be functionalized with a carboxyl group or hydroxyl group by copolymerizing the first layer with acrylates or phenolics, in order to couple the particle with a protein.

Encapsulation processes for applying the additional coating are known in the art. See also, U.S. Pat. No. 4,861,627 to Mathiowitz. In one embodiment of coating (i.e. encapsulating) polyethylene magnetic nanoparticles, the coating polymer and the nanoparticles are dispersed in a solvent for the polymer, such as methylene chloride. An example of such an encapsulation process is described in Example 6 below.

Essentially any polymer that is soluble in the solvent can be used to encapsulate the nanoparticles. Representative examples of suitable classes of polymeric encapsulation materials include polyesters, polyanhydrides, polystyrenes, and blends thereof. For biocompatibility purposes, the polymeric shell can comprise polymers of lactic acid or glycolic acid or a poly(lactide-co-glycolide).

For example, with methylene chloride, suitable polymers include nonpeptide polyamines (e.g., poly(aminostyrene), poly(aminoacrylate), poly(N-methyl aminoacrylate), poly (N-ethylaminoacrylate), poly(N,N-dimethyl aminoacrylate), poly(N,N-diethylaminoacrylate), poly(aminomethacrylate), poly(N-methyl amino-methacrylate), poly(N-ethyl aminomethacrylate), poly(N,N-dimethyl aminomethacrylate), poly(N,N-diethyl aminomethacrylate), and poly(ethyleneimine)); polymers of quaternary amines (e.g., poly(N,N,N-trimethylaminoacrylate chloride), poly(methyacrylaminopropyltrimethyl ammonium chloride), poly(ethyloxazoline), and poly(N-vinyl pyrrolidone)); and synthetic biodegradable polymers (e.g., polylactic acid, poly (dl) lactide-co-glycolide, and polyglycolic acid).

The Polymeric Nanoparticles

The polymeric magnetic nanoparticles can be substantially spherical or can comprise a mixture of particles that are spherical and elliptical. Exemplary ranges for the number average diameter of the polymeric nanoparticles include, from about 50 m to about 500 nm (e.g., from about 100 run to about 400 nm, from about 200 nm to about 370 nm, from about 250 nm to about 300 nm). In one embodiment, the polymeric nanoparticles preferably exhibit superparamagnetic behavior. The size can be critical to many applications. In particular, for in vivo applications, the size can determine whether the nanoparticles accumulate and/or how the body removes (e.g., phagocytosis) or biodegrades them.

In one embodiment, the 200 to 400 nm polymeric magnetic nanoparticles comprise a composite of a low molecule weight polyethylene coating 5 to 10 nm maghemite nanoparticles, i.e. larger polyethylene nanoparticles having smaller maghemite nanoparticles dispersed therein. In another embodiment, the polyethylene-maghemite nanoparticles further include a ligand coating adsorbed to the surface of the nanoparticles.

Use of the Polymeric Nanoparticles

The polymeric magnetic nanoparticles made by the process described herein can be used in a variety of applications. Representative examples of such applications include magnetic separation processes, MRI, immunoassays, in vitro diagnostics, as a medium for transdermal drug delivery, and other biomedical processes, such as cell labeling, phagocytosis, site specific chemotherapy, radio immunoassay, affinity chromatography, and enzyme assay, and so forth. The particles could be useful in drug delivery or diagnostic imaging (e.g., for the delivery of contrast agents). Other possible applications include calibration of flow cytometers, particle and hematology analyzers, confocal laser scanning microscopes, and zeta potential measuring instruments; supports for immobilized enzymes, peptide synthesis, and separation phases for chromatography.

In a preferred embodiment, the polymeric magnetic nanoparticles are used in a batch or continuous process for the magnetic separation and isolation of blood components from a whole blood sample, for the treatment and clinical and laboratory testing of such blood components. Such magnetic processes are described, for example, in U.S. Pat. No. 6,129,848 to Chen, et al., which is incorporated herein by reference.

The invention can be further understood with the following non-limiting examples.

EXAMPLE 1

Synthesis of Magnetic Nanoparticles of Polyethylene Wax

A. Synthesis and Modification of Maghemite Particles

Iron oxide ($\gamma Fe_2O_3$) particles having an average diameter range between about 5 and 10 nm were synthesized using a three-step process of (i) coprecipitation of ferrous chloride and ferric chloride by sodium hydroxide, (ii) peptidization with nitric acid, and (iii) sonication. Ferrous chloride and ferric chloride were mixed in a molar ration of 1:2 in deionized water at a concentration of 0.1 M iron ions, and this solution was used immediately after preparation. A 10 M concentration solution of sodium hydroxide was added to it for coprecipitation with continuous stirring. Next, the solution with the precipitate was stirred at a high speed for one hour at 20° C., and then heated to 90° C. for one hour with continuous stirring. The ultrafine magnetic particles obtained were peptized by nitric acid (2M). Subsequently, the iron oxide dispersion was sonicated for 10 min. at 90° C. at 50% amplitude. The precipitate was then washed repeatedly with deionized water and filtered and dried under vacuum to yield fine iron oxide particles.

These particles were then modified with sodium oleate (an anionic surfactant, obtained from Sigma-Aldrich) in order to promote their attachment to polyethylene. The modification was carried out by mixing the iron oxide powder with sodium oleate (30% of the weight of the polymer) in water, and then stirring at a moderate speed for about 2 hours. The resulting mixture was then dried to remove the water, yielding the modified iron oxide powder useful in forming polyethylene composite particles.

B. Formation of the Composite Particles

A very dilute (0.05% w/w) solution (10 ml) of polyethylene wax (number average MW of 700 g/mole, obtained from Honeywell Corp.) was made using decaline or OMCTS at 150° C. To this solution, a quantity of the modified iron oxide powder was added, at 30% or 50% of the weight of the polyethylene, and sonicated at 50% amplitude for about 30 seconds. Then, 10 ml (volume equal to volume of solvent) of a non-solvent, tetraglyme ("TG") (obtained from Sigma-Aldrich), at 150° C. was added to the mixture, and the resulting second mixture sonicated at 50% amplitude for about 30 seconds.

Next, the mixture was immediately cooled to about 0° C., by immersing the scintillation vial in icewater held at 0° C. Within three to four minutes, the mixture transformed into a microphase separated system, which included of microdroplets of supercooled polyethylene wax solution and iron oxide dispersed in a continuous phase of nonsolvent. The emulsion was then warmed to room temperature (e.g., about 25 to 27° C.) by removing the scintillation vial from the ice bath. Within about 45 minutes to about 1 hour, polyethylene particles, along with maghemite, were found to be suspended in the emulsion. The emulsion was then cooled to −10° C. and maintained at this temperature for about half an hour in order to form a macrophase separated system.

After about a half hour, a thin reddish-brown layer was observed at the interface of (i.e. between) a top layer of liquid (solvent) and a bottom layer of liquid (non-solvent). These top and bottom layers were then extracted using a micropipette and a syringe. The remaining solvent mixture (i.e. the reddish-brown layer), which contained the polyethylene/iron oxide particles, was then centrifuged in a microcentrifuge to isolate the particles from the remainder of the solvent mixture. The remaining solvent was removed by washing the particles with acetone.

This batch process was repeated using various process parameters. Specifically, six different batches of particles were made using two solvents at two different speeds of sonication and with two different concentrations of polymers in each of two solvents. The second solvent (other than decalin) used was octamethylcyclotetrasiloxane (OMCTS), obtained from Dow Chemical Company. The conditions of the experiments and the resulting particle characteristics are shown in Table 1. Transmission electron micrographs of the composite particles from Batch Numbers 1 to 7 are shown in FIGS. 2 to 8, respectively.

TABLE 1

PROCESS PARAMETERS AND RESULTS

| Batch No. | Polymer Concentration (w/v) % | Solvent / Nonsolvent | Amplitude Of Ultrasonication | % of Maghemite | Particle Morphology & Avg. Size |
|---|---|---|---|---|---|
| 1 | 0.05 | Decalin/TG | 50% | 50% | Spherical/elliptical, ~300 nm |
| 2 | 0.05 | Decalin/TG | 80% | 50% | Spherical/elliptical*, ~370 nm |
| 3 | 0.1 | Decalin/TG | 50% | 30% | Spherical/elliptical, ~200 nm |
| 4 | 0.1 | Decalin/TG | 80% | 30% | Spherical/elliptical*, ~360 nm |
| 5 | 0.5 | OMCTS/TG | 50% | 50% | Spherical, ~300 nm |
| 6 | 0.1 | OMCTS/TG | 50% | 30% | Spherical, ~250 nm |
| 7 | 0.1 | OMCTS/TG | 80% | 30% | Not well formed |

*Poor attachment with maghemite

EXAMPLE 2

Protein Coupling with the Polyethylene Composite Particles

An appropriate amount of a ligand was dissolved in an adsorption buffer (sodium acetate/acetic acid, pH 5). (The amount of protein needed to form a monolayer around the magnetic nanoparticles can be calculated as described in U.S. Pat. No. 3,857,931.) Avidin was used as ligand, as it has a strong bond forming ability with various ligands used in immunoassays. A polyethylene magnetic particle suspension (in the same buffer, 10% solid) was added to the protein solution and mixed gently for about 1 to 2 hours. The suspension was then incubated at room temperature for about 2 hours. The resulting mixture was then centrifuged. The supernatant was tested (using a BCA protein assay kit and a Turner spectrophotometer (SP 830) at a wavelength of about 562 nm) to determine the amount of bound proteins.

Protein coupling efficiency was measured for the composite particles. It was found that only 30% of the calculated amount of avidin required for monolayer formation on polyethylene particles was used to coat the particles, with the remaining portion unadsorbed.

EXAMPLE 3

Morphology of the Polyethylene Composite Particles

Optical microscopy, scanning transmission electron microscopy, and atomic force microscopy studies were performed on the composite particles described in Examples 1 and 2.

A. Microscopy Procedures

Optical Microscopy was performed in a Leica DMIL Inverted Fluorescence Microscope (magnification ×1000) fitted with a Diagnostic High Resolution Spot Camera controlled by software interfaced with a PC.

Scanning Transmission Electron Microscopy (STEM) was performed in a JEOL 2010 microscope operated at 200 KV. Bright field imaging techniques were used to image the samples by selecting the transmitted diffraction spot to form the image. An ATM CCD Camera and software carry the image acquisition. One drop of polyethylene composite particles in acetone was placed on a carbon coated copper grid, dried, and observed under the microscope.

A D-3000 Nanoscope from Digital Instruments was used in tapping mode. One drop of sample was placed on the cleaved Mica surface and observed under the microscope. Micrographs were taken in both height and amplitude mode.

B. Results and Discussion

The micrographs indicate that particle morphology is dependent upon the choice of solvent. Optical micrographs (FIG. 1) show that the particles have mixed shaped, spherical and elongated, and they are in the submicron size range. Transmission electron micrographs (FIGS. 2–6) show that the particles have diameters between about 50 and 500 nm, with two type of distinct morphology: one that is spherical and one that is elliptical.

It was found that the increase in the amplitude for ultrasonication during solvent-nonsolvent and polymer mixing gave smaller particles after crystallization. At 80% amplitude, there was a lack of attachment of the iron oxide particles to the polyethylene and mostly irregular shaped particles were formed, irrespective of the choice of solvent. In contrast, using 50% amplitude, the composite particles were more regularly shaped and showed better maghemite-polymer attachment, with both types of solvents.

The polymer concentration did not have much effect on particle size. When the polymer crystallized from the solvent in the nonsolvent medium, it had maghemite on the surface, which affects the particle's growth and final shape. Final particle size was dependent on the size of the microdroplets in the solvent-nonsolvent emulsion.

Figure 5:
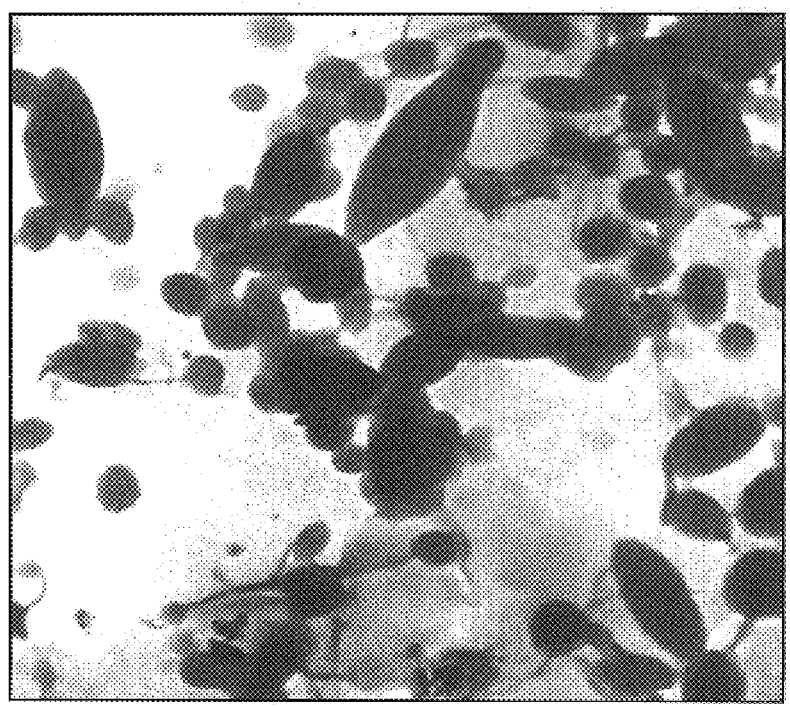
FIG. 5 is a transmission electron micrograph of polyethylene/maghemite composite nanoparticles obtained by one embodiment of the process.
Figure 6:
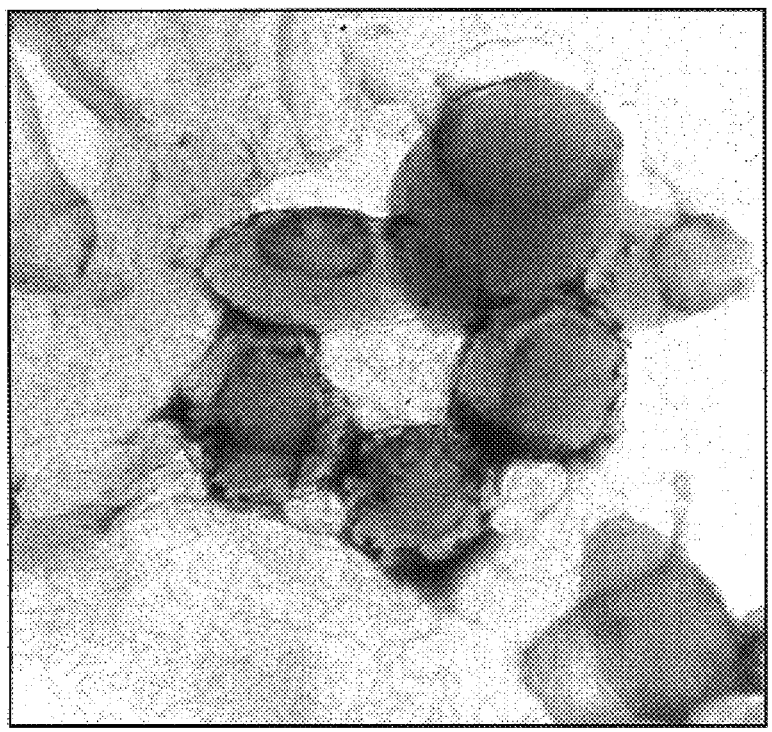
FIG. 6 is a transmission electron micrograph of polyethylene/maghemite composite nanoparticles obtained by one embodiment of the process.
Figure 7:
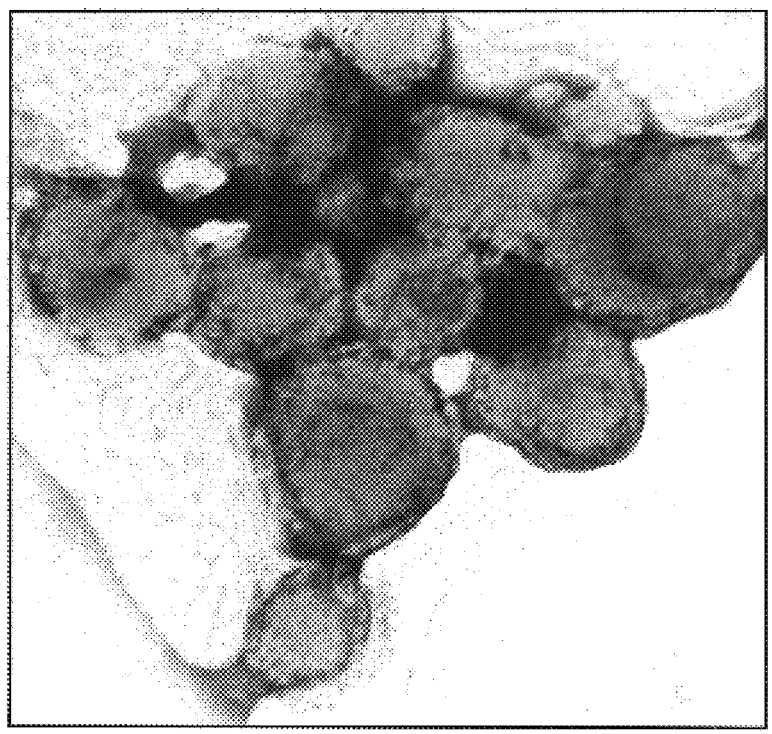
FIG. 7 is a transmission electron micrograph of polyethylene/maghemite composite nanoparticles obtained by one embodiment of the process.

Particles formed from OMCTS/tetraglyme emulsion showed mostly spherical morphology under different experimental conditions (FIGS. 5–7). However, the particles formed from the Decalin/tetraglyme system have both elliptical and spherical morphology. The low molecular weight polyethylene used in this study has a very wide distribution of molecular weights (300–700 g/mole). It has been reported that fractionations occur for solution growth crystals of polyethylene with shorter molecules concentrated toward the edges of lamella within the crystal. This may be one of the reasons for different morphology of the particles. Elliptical particles may have an advantage of functionalizing/coupling with them on one side.

The whole system, after the addition of a nonsolvent, becomes a phase separated system, which leads to a precipitation of a swollen polymer and is used in fractionation and recrystallization. The lower value of crystallinity for the solution crystallized pure particles and composite particles as obtained from differential scanning calorimetry study can be further evidence for fractionation and recrystallization.

Figure 8:
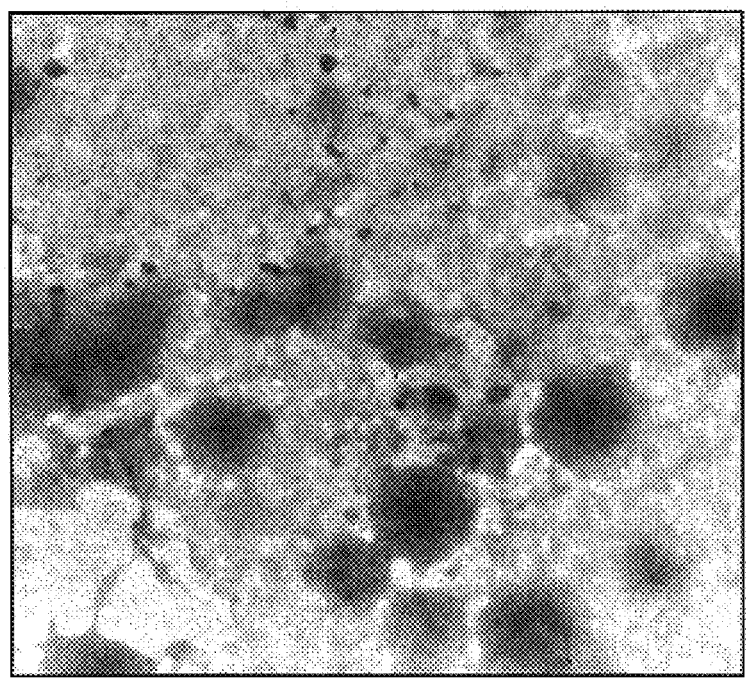
FIG. 8 is a transmission electron micrograph of polyethylene/maghemite composite nanoparticles obtained by one embodiment of the process.

The effect of ultrasonication at the dissolution and mixing step where interparticle collision occurred due to ultrasonication needs to be considered. It has been reported that this leads to agglomeration and change in particle morphology. Particles are not well formed when 80% amplification was used, as shown in FIG. 8.

Figure 9:
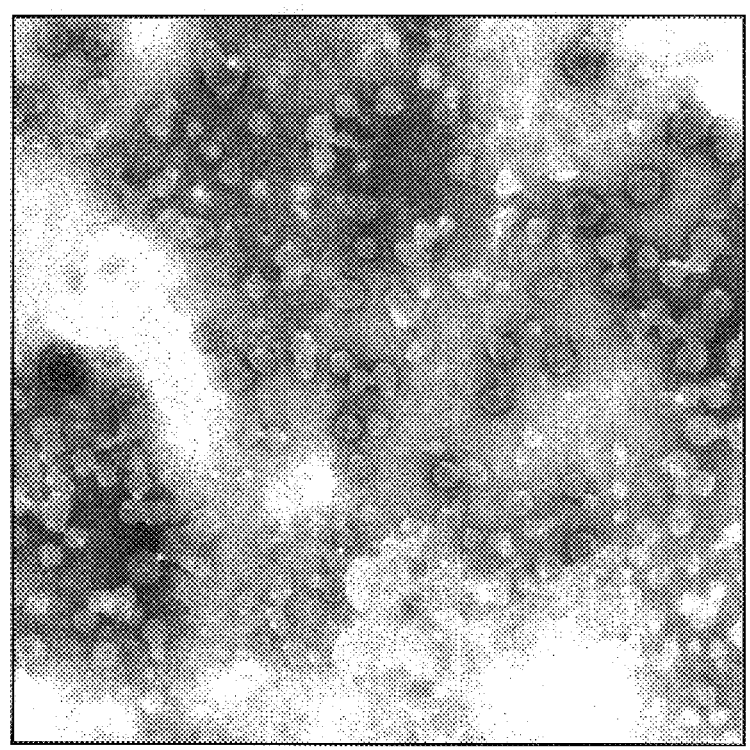
FIG. 9 is a transmission electron micrograph of polyethylene nonmagnetic nanoparticles.
Figure 10:
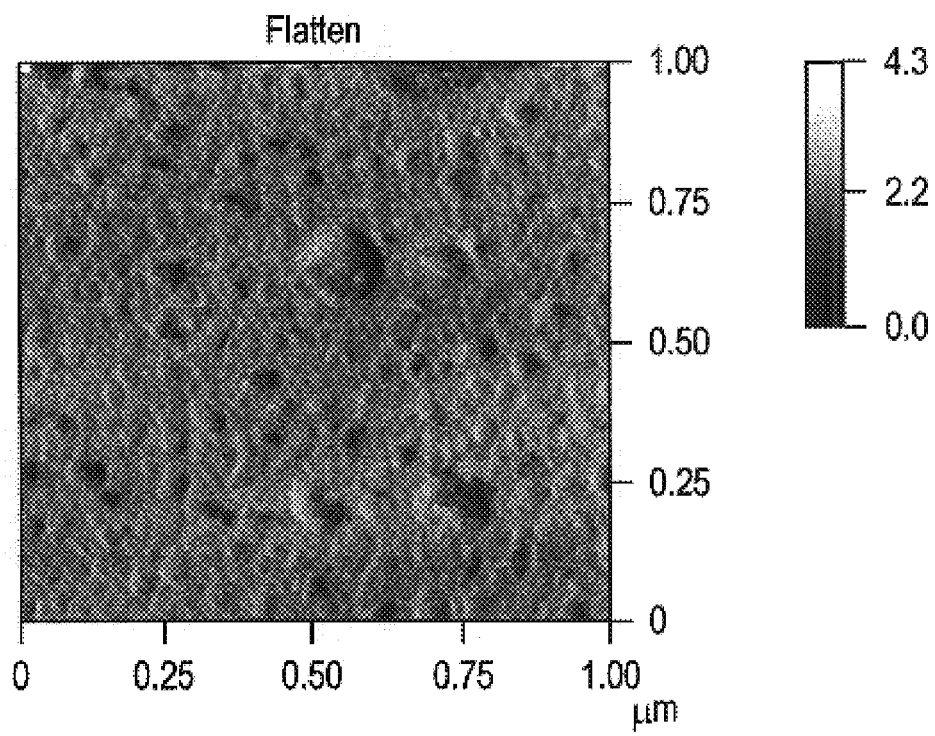
FIG. 10 is an atomic force micrograph for polyethylene composite nanoparticles (in amplitude mode).
Figure 11:
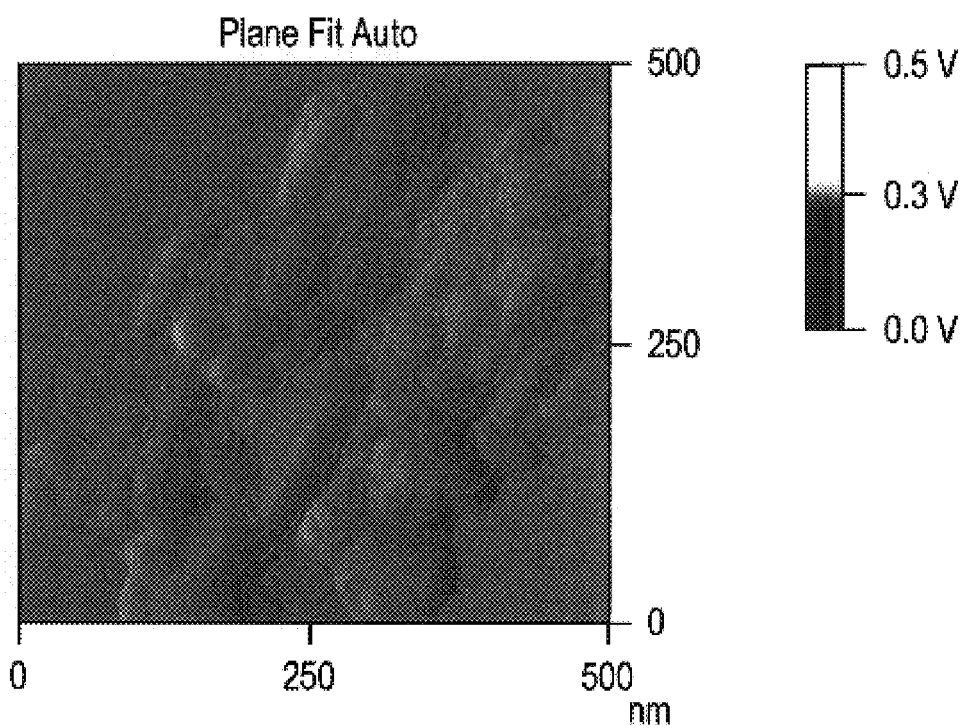
FIG. 11 is an atomic force micrograph for avidin-coated polyethylene composite nanoparticles (in amplitude mode).

For comparative purposes, polyethylene nonmagnetic particles were formed from an emulsion of OMCTS/tetraglyme using an amplitude of sonication of 50%. These are shown in FIG. 9. An atomic force micrograph for the polyethylene composite particles and avidin-coated particles is shown in FIG. 10 and FIG. 11, respectively. Particles are found to be agglomerated after protein adsorption on their surface due to protein-protein interaction. The atomic force micrographs both spherical and elliptical shaped morphologies were observed.

EXAMPLE 4

Magnetic Properties of the Polyethylene Composite Particles

As the composite nanoparticles can be used in biomedical applications where an external magnetic field induces a force capable of separating these particles from the mainstream, the measurement of magnetic property is considered an important aspect of characterization.

A Quantum Design MPMS5 DC Superconducting Quantum Interface Device (SQUID) was used to study the magnetic property of the maghemite particles and the polyethylene magnetic particles. A weighted amount of sample (obtained from Batch 1) was packed in gel capsules and placed tightly in the glass tube ensuring no movement in either direction. The magnetic properties were then measured.

Figure 12A:
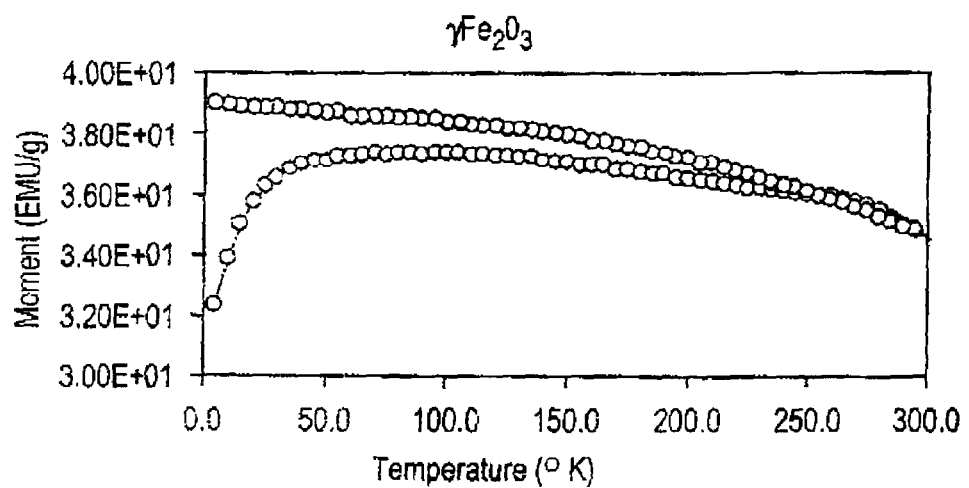
FIG. 12 depicts two graphs showing temperature susceptibility for pure $\lambda Fe_2O_3$ and polyethylene composite particles.
Figure 12B:
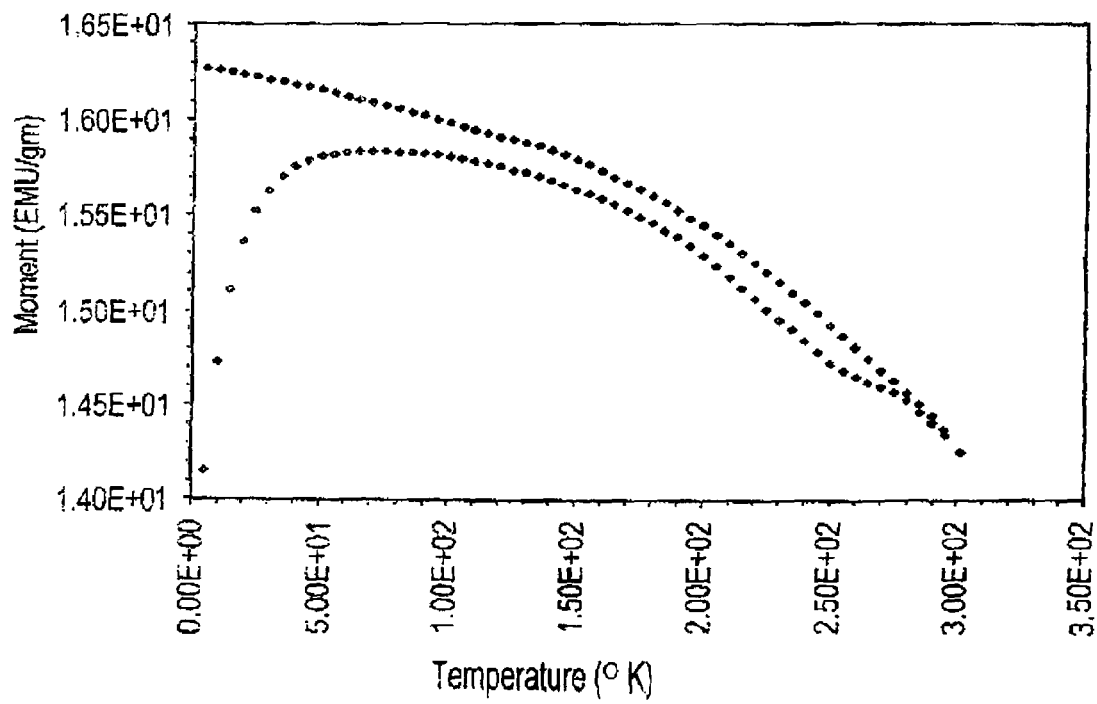

FIG. 12 shows temperature dependence of susceptibility for the maghemite particle and the polyethylene composite particles after (a) cooling in zero field (ZFC), and (b) cooling in an applied field of 50G. The blocking temperature ($T_B$) is an important parameter when studying a magnetic nanoparticle system. $T_B$ is generally obtained by analyzing the zero field cooled and field cooled susceptibility. The smallest size maghemite particles synthesized by the study showed a blocking temperature of 75K and the blocking temperature for composite particles was 60K. Sample density is a factor that influences blocking temperature. Interparticle distance, size, and shape of the particle are factors that affect the sample density, and thus the blocking temperature. Blocking temperature is given by the relation:

$$T_B = \frac{E_a}{k_B \ln(tf_0)} \quad \text{EQ. 1}$$

where $E_a$ is the interaction energy in which interparticle interactions are considered as magnetic dipole-dipole interactions.

In this experiment, the interparticle distance probably played the most important role for the decreased value of the blocking temperature. The interaction energy between two particles with identical moment M can be given as follows:

$$Ei \propto \frac{M^2(3\cos\psi_1\cos\psi_2 - \cos a)}{r^3} \quad \text{EQ. 2}$$

where r is the distance between particles, $\psi_1$ and $\psi_2$ are the angles between r and two moments, respectively, and a is the angle between the two moments. Coating of maghemite with polyethylene certainly increased the average distance r, which decreased interaction and thus decreased the blocking temperature. From these equations, it is clear that density is also linearly related to blocking temperature. The density of the polymer-coated particles is much lower than that of pure maghemite. Hence, a lower value of $T_B$ was obtained in the experiment. From FIG. 12, it was also observed that the moment/unit mass (EMU/g) of the composite particles is smaller than the moment/unit mass of pure maghemite, which is due to a significant portion of the volume of the composite particle being polymer. In general, $$\mu(H) = \chi'(H)m = \chi'(H)\rho V \quad \text{EQ.3}$$

where $\mu$ is the magnetic moment, $\chi$ is the mass susceptibility, $\rho$ is the density, and V is the volume of particles. In the case of pure maghemite ($\gamma Fe_2O_3$), $$\mu(H)_{Fe_2O_3} = \chi'(H)_{Fe_2O_3}\rho_{Fe_2O_3}V_{Fe_2O_3} \quad \text{EQ.4}$$

In the case of the composite particle (particles coated with polymer, $$\mu(H)_{Comp} = \chi'(H)_{Fe_2O_3}\rho_{Fe_2O_3}V_{Fe_2O_3} + \chi'(H)_{PE}\rho_{PE}V_{PE} \quad \text{EQ.5}$$

Figure 13A:
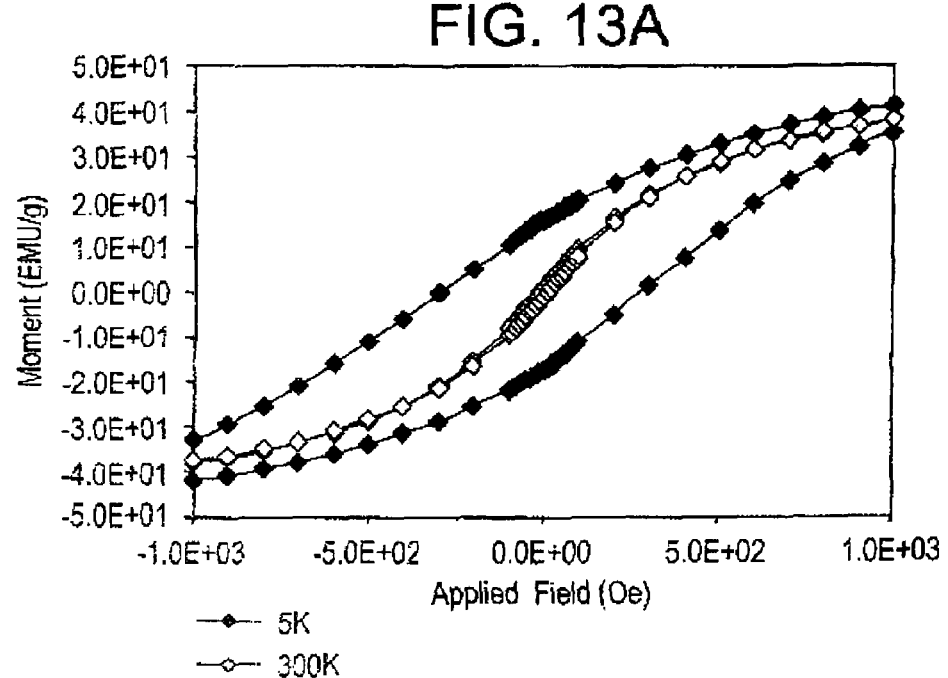
FIG. 13 depicts a graph of applied field versus magnetization for polyethylene composite particles.
Figure 13B:
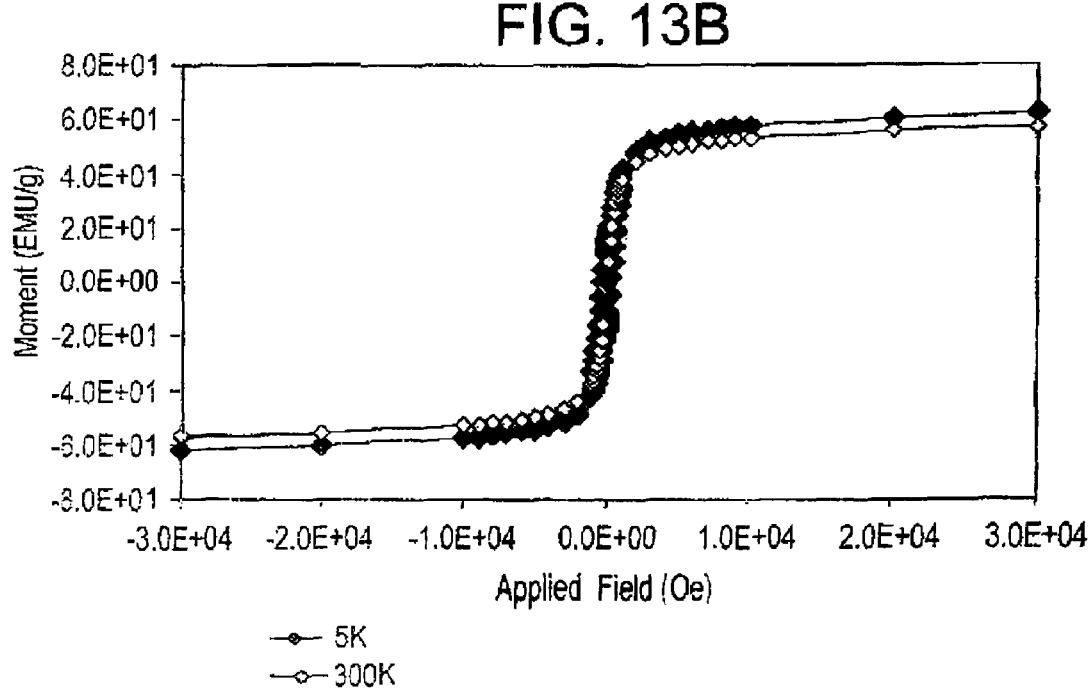

Since $V_{Comp} = V_{Fe2O3} + V_{PE}$, $\chi_{PE} << \chi_{Fe2O3}$, and $\rho_{PE} << \rho_{Fe2O3}$, there is much less magnetic constituent per unit mass in the composite nanoparticles. The reason for the lower value of magnetic moment for the composite particle is due to the effect of displacing the volume of magnetic particles with polymer with much lower moment. The smaller plot in FIG. 12 shows wide distribution of particle sizes in $\gamma Fe_2O_3$, whereas the larger plot shows that the composite nanoparticles had narrower distribution of sizes. A magnetization curve for the composite particles is shown in FIG. 13 for 5K and 300K. At 5K, the hysterisis is rather sizable with a coercive field. The hysterisis loop is also symmetric about the center of this temperature. This symmetric nature of the loop is a characteristic of superparamagnetic behavior. The magnetization curve at 300K shows no hysterisis and both plots obtained at the two different temperatures fall under the same universal curve demonstrating the superparamagnetic behavior of the composite nanoparticles.

EXAMPLE 5

Crystallinity of the Polyethylene Composite Particles

A Perkin Elmer DSC 7 equipped with a Perkin Elmer 3700 data station was used for Differential Scanning Calorimeter, and the instrument was calibrated with the Indium standard. Approximately 4 mg of pure polyethylene wax sample was heated first to a temperature of about 150° C., quenched to room temperature and held at this temperature for about 10 minutes to ensure complete crystallization, and then reheated at a rate of about 10° C./min. to about 150° C. Similarly, pure polyethylene particles and polyethylene composite particles (obtained from Batch 1) each formed by solvent-nonsolvent and temperature induced crystallization were heated in aluminum pans from about 40° C. to about 150° C. at the same heating rate. The peak temperature in the endotherm was considered as the melting temperature and the crystallinity values were calculated based on the standard heat fusion value of polyethylene. (<Hu=290 J/g).

The degree of crystallinity value for the pure polymer, the polymer crystallized from solvent-nonsolvent emulsion (without iron oxide), and composite particles were obtained from their heat of fusion values. As expected, the composite particles showed the lowest value of crystallinity indicating the presence of another material within the polymer. Polymer particles formed without maghemite also showed lower crystallinity compared to the pure polymer indicating fractionation by the effect of dissolution and recrystallization process. These crystallinity values and melting points are shown in Table 2.

TABLE 2

CRYSTALLINITY AND MELTING POINT DATA

| Sample | Melting Point (° C.) | Degree of Crystallinity (%) |
| --- | --- | --- |
| PE Wax | 85.5 | 74.2 |
| PE Particles | 87.5 | 53.4 |
| PE/Maghemite Particles | 85.4 | 16.7 |

Crystallinity of a composite is a function of the individual crystallinity of the components and is composition dependent. As polyethylene wax is a crystalline polymer, its crystallinity in pure form and in composite form was studied. Decreased value of the crystallinity in the composite show the presence of iron oxide in the composite. The lower crystallinity value of the PE particles than that of the pure polyethylene supports the fractionation of the sample.

EXAMPLE 6

Preparation of Polylactic Acid Coated Composite Particles

Figure 14:
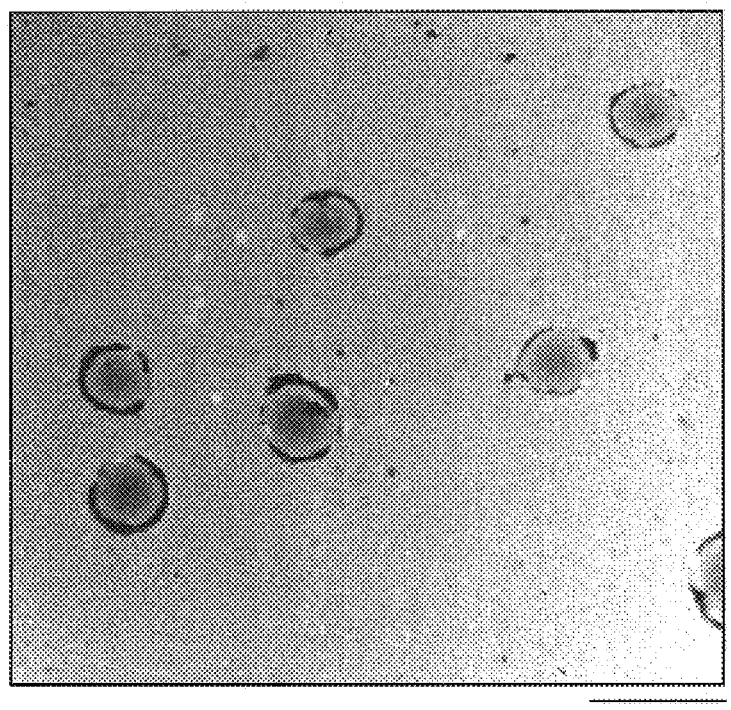
FIG. 14 is a transmission electron micrograph of polyethylene/maghemite composite nanoparticles coated with PLA polymer.

In this example, 0.2 mg of polyethylene magnetic nanoparticles, made as described in Example 1, and poly (dl) lactic acid (1:1 by weight) ("PLA") were dispersed in 1 ml of methylene chloride and heated to 50° C. to completely dissolve the PLA. The dispersion was then allowed to cool to room temperature, and then a slight excess of methanol was added. A precipitate of coated composite nanoparticles were obtained almost immediately. See FIG. 14.

EXAMPLE 7

Preparation of Fe—Nd—B Nanoparticles

A 0.2 M solution of ferrous sulphate and neodymium chloride solution was made, in 80:20 (w/w) proportion. Then, 25 ml of this solution (at pH 6) was added dropwise to a 25 ml solution of sodium borohydride (at pH 13) at 0° C. The addition was performed in thirty minutes. The reaction was continued for another 15 min. with vigorous stirring. The back precipitate was washed with water and finally by acetone, yielding ferromagnetic Fe—Nd—B nanoparticles, 30–50 nm in size, suitable for polymeric encapsulation.

Publications cited herein and the materials for which they are cited are specifically incorporated by reference. Modifications and variations of the methods and devices described herein will be obvious to those skilled in the art from the foregoing detailed description. Such modifications and variations are intended to come within the scope of the appended claims.

We claim:

1. A method of making polymeric nanoparticles comprising:
    providing active agent nanoparticles having an average diameter between about 5 and about 100 nm;
    treating said active agent nanoparticles with an anionic surfactant to form modified active agent nanoparticles:
    mixing the modified active agent nanoparticles with a solution of a polymer in a solvent at a first temperature, which is greater than the melting temperature of the polymer and less than the boiling point of the solvent to form a first mixture, said mixing comprising the use of sonication;
    mixing a non-solvent with the first mixture to form a second mixture, the non-solvent being non-solvent for the solvent and for the polymer and having a boiling point greater than the melting temperature of the polymer;
    sonicating the second mixture to form an emulsion; and
    cooling the emulsion to a second temperature and at a rate effective to precipitate polymeric nanoparticles comprising the polymer with the modified active agent nanoparticles dispersed therein.

2. The method of claim 1, further comprising isolating the polymeric nanoparticles from the solvent and the non-solvent.

3. The method of claim 1 wherein the concentration of polymer in the solution is between 0.01 and 0.1 w/v %.

4. The method of claim 1, wherein die polymer has a melting temperature of 200° C. or lower.

5. The method of claim 1, wherein the polymer is a crystalline polymer.

6. The method or claim 1, wherein the polymer has a number average molecular weight between 1 kDa and 50 kDa.

7. The method of claim 1, wherein the polymer has a number average molecular weight of about 1,000 g/mole or less.

8. The method of claim 1, wherein the polymer is selected from the group consisting of polyamides, polycarbonates, polyalkenes, polyvinyl ethers, polyglycolides, cellulose ethers, polyvinyl halides, polyglycolic acid, and polylactic acid.

9. The method of claim 1, wherein the polymer comprises polyethylene.

10. The method of claim 1, wherein the step of treating said active agent nanoparticles with an anionic surfactant comprises mixing the active agent nanoparticles in an aqueous solution of the anionic surfactant and then drying the mixture to remove water and form a city powder comprising the modified active agent nanoparticles.

11. The method of claim 1, wherein the anionic surfactant is selected from the group consisting of sodium oleate, sodium palmitate, sodium myristate, sodium stearate, and sodium dodecyl sulphate.

12. The method of claim 1, wherein the solvent is selected from the group consisting of decalin, octamethylcyclotetrasiloxane, tetralin, toluene, and dodecane.

13. The method of claim 1, wherein the non-solvent comprises tetraglyme.

14. The method of claim 1, wherein the first temperature is between 100 and 175° C.

15. The method of claim 1, wherein the second temperature is 20° C. or lower.

16. The method of claim 1, wherein the mixing of a non-solvent with the first mixture and the sonicating of the second mixture are conducted in the same step.

17. The method of claim 1, wherein the polymeric nanoparticles have an average diameter between 50 and 500 nm.

18. The method of claim 17, wherein the polymeric nanoparticles have an average diameter between 200 and 400 nm.

19. The method of claim 1, further comprising adsorbing a protein-binding ligand onto the polymeric nanoparticles.

20. The method of claim 19, wherein the protein-binding ligand is selected from the group consisting of avidin, biotin, streptavidin, and lectins.

21. The method of claim 1, further comprising encapsulating the polymeric nanoparticles in a polymeric shell.

22. The method of claim 21, wherein the polymeric shell comprises a polymer selected from the group consisting of polyesters, polyanhydrides, polystyrenes, and blends thereof.

23. The method of claim 21, wherein the polymeric shell comprises polymers of lactic acid or glycolic acid or a poly(lactide-co-glycolide).

24. The method of claim 1, wherein the active agent nanoparticles comprise active agents selected from the group consisting of magnetic materials, drugs, diagnostic agents, inorganic fertilizers, and inorganic pigments.

25. The method of claim 1, wherein the active agent nanoparticles have a number average diameter between about 5 nm and about 10 nm.

26. The method of claim 1, wherein the active agent nanoparticles comprise superparamagnetic nanoparticles.

27. The method of claim 26, wherein the superparamagnetic nanoparticles comprise item nickel, or cobalt.

28. The method of claim 26, wherein the superparamagnetic nanoparticles comprise maghemite.

29. A composition comprising polymeric nanoparticles made by the method of claim 1.

30. A method of making polymeric nanoparticles comprising:

providing superparamagnetic nanoparticles having an average diameter between about 5 and about 10 nm;

treating said superparamagnetic nanoparticles with an anionic surfactant to form modified superparamagnetic nanoparticles;

mixing the modified superparamagnetic nanoparticles with a solution of a polymer in a solvent at a first temperature, which is greater than the melting temperature of the polymer and less than to boiling point of the solvent to form a first mixture, said mixing comprising the use of sonication;

mixing a non-solvent with the first mixture to form a second mixture, the non-solvent being a non-solvent for the solvent and for the polymer and having a boiling point greater than the melting temperature of the polymer;

sonicating the second mixture to form an emulsion; and cooling the emulsion to a second temperature and at a rate effective to precipitate polymeric nanoparticles comprising the polymer with the modified superparamagnetic nanoparticles dispersed therein.

31. The method of claim 30, wherein the superparamagnetic nanoparticles comprise maghemite.

32. A composition comprising polymeric nanoparticles made by the method of claim 30.

33. The composition of claim 32, wherein the polymer comprises polyethylene.

34. The composition of claim 32, wherein the superparamagnetic nanoparticles comprise maghemite.

* * * * *